(12) United States Patent
Clifton et al.

(10) Patent No.: US 9,542,289 B2
(45) Date of Patent: Jan. 10, 2017

(54) COMPUTER NODE TESTING

(71) Applicant: International Business Machines Corporation, Armonk, NY (US)

(72) Inventors: John M. Clifton, Hertford (GB); Matthew J. Fairhurst, Winchester (GB)

(73) Assignee: International Business Machines Corporation, Armonk, NY (US)

(*) Notice: Subject to any disclaimer, the term of this patent is extended or adjusted under 35 U.S.C. 154(b) by 34 days.

(21) Appl. No.: 14/609,522

(22) Filed: Jan. 30, 2015

(65) Prior Publication Data

US 2015/0255116 A1 Sep. 10, 2015

(30) Foreign Application Priority Data

Mar. 10, 2014 (GB) .................................. 1404142.0

(51) Int. Cl.
*G11B 27/36* (2006.01)
*G06F 11/26* (2006.01)

(52) U.S. Cl.
CPC .............. *G06F 11/26* (2013.01); *G11B 27/36* (2013.01); *G11B 2220/2516* (2013.01); *G11B 2220/41* (2013.01)

(58) Field of Classification Search
CPC combination set(s) only.
See application file for complete search history.

(56) References Cited

U.S. PATENT DOCUMENTS

| 5,834,856 | A | 11/1998 | Tavallaei et al. |
| 7,024,592 | B1 | 4/2006 | Voas et al. |
| 8,375,249 | B1 | 2/2013 | LoRusso |
| 2004/0003222 | A1 | 1/2004 | Rich et al. |
| 2008/0256307 | A1* | 10/2008 | Fujimoto ............. G06F 1/3203 711/154 |

OTHER PUBLICATIONS

Tikotekar et al., "Evaluation of Fault-Tolerant Policies Using Simulation," 2007 IEEE International Conference on Cluster Computing, Sep. 17-20, 2007, pp. 303-311, Austin, TX DOI: 10.1109/CLUSTR.2007.4629244.
GB Application 1404142.0, entitled "Computer Node Testing," filed Mar. 10, 2014.
International Search Report dated Jul. 23, 2014 for International Application GB1404142.0.

* cited by examiner

*Primary Examiner* — Walter L Lindsay, Jr.
*Assistant Examiner* — Jas Sanghera
(74) *Attorney, Agent, or Firm* — Nicholas D. Bowman

(57) ABSTRACT

A computer node comprises dual hard drives. A method of testing the computer node comprises performing a test of the first hard drive, waiting a specific time period, and performing a test of the second hard drive. Each test comprises isolating the drive being tested, writing data to the drive being tested, removing power from the drive being tested, repowering the drive being tested, and reading data from the drive being tested.

15 Claims, 4 Drawing Sheets

COMPUTER NODE TESTING

BACKGROUND

The present disclosure relates to a method of testing a computer node and to the computer node itself.

In clustered computer systems comprising a network of computer nodes, it is known that upgrades can fail due to the system drive in a clustered node failing at the point at which it is rebooted to perform its part of the upgrade procedure. A system drive refers to the drive that contains the operating system for the node and does not contain stored data. This weakness is difficult for a computer system administrator to spot in advance because a drive will get into a state where it is going to fail the next time the system is rebooted, but won't display any degraded function during normal running. The computer node can then remain this "faulty" state for any length of time, only exhibiting the failure at the point at which a reboot is performed. An upgrade is very often the only time a node is actually rebooted and this is a particularly bad time for a system drive failure to occur, because it leaves the clustered computer system exposed.

Nodes may be designed with dual redundant hard drives to help counter this problem, but this is only a complete solution if the chance of both drives failing on the same reboot is significantly improved over the chances of one drive failing on a single reboot. Theoretically, the chance of both drives failing on the same reboot=(chance of a single drive failing on the next reboot)*(chance of a single drive failing on the next reboot). However, the chance of both drives failing on the same reboot is in fact much more related to the expected length of time before a drive goes into the faulty state where it will fail at the next reboot and comparing that to how often a server is rebooted.

SUMMARY

According to certain aspects of the present disclosure, there is provided a method of testing a computer node comprising dual hard drives, the method comprising performing a test of the first hard drive, waiting a specific time period, and performing a test of the second hard drive, wherein each test comprises isolating the drive being tested, writing data to the drive being tested, removing power from the drive being tested, repowering the drive being tested, and reading data from the drive being tested.

According to other aspects of the present disclosure, there is provided a computer node comprising dual hard drives and a drive health monitor, the drive health monitor configured to perform a test of the first hard drive, wait a specific time period, and perform a test of the second hard drive, wherein each test comprises isolating the drive being tested, writing data to the drive being tested, removing power from the drive being tested, repowering the drive being tested, and reading data from the drive being tested.

According to other aspects of the present disclosure, there is provided a computer program product on a computer readable medium for testing a computer node comprising dual hard drives, the computer program product comprising instructions for performing a test of the first hard drive, waiting a specific time period, and performing a test of the second hard drive, wherein each test comprises instructions for isolating the drive being tested, writing data to the drive being tested, removing power from the drive being tested, repowering the drive being tested, and reading data from the drive being tested.

According to the present disclosure, it is possible to provide a dual drive computing node that will be able to detect a likely future failure, for example when a computer node is upgraded. This is achieved by periodically testing each drive of the computer node. The two, or more, drives in the computer node will each have a copy of the node operating system. This means that the computer node can run off either drive exclusively, at least for a short period of time. The improved computer node will, either using a regular timer or at the request of an administrator, go into a single drive mode and then simulate a reboot on the other system drive without any interruption to the user IO function of the node. Both drives can be tested in turn, in this way. This then allows the computer node to spot a drive that is in a faulty state, where it will likely fail across a future reboot, without there being any significant impact to the cluster since the faulty drive can be immediately flagged for replacement.

As far as a drive is concerned, a reboot can consist of operations similar to: writing a large chunk of data to the drive, removing power from the drive, re-powering the drive and reading a large chunk of data from the drive. The improved computer node can periodically run these operations, optionally with any other operations involved in a reboot, to check whether the drive is in the "faulty" state, where it will likely fail if the node were to reboot for real. In many clustered computer systems of such nodes, day-to-day drive use differs significantly from reboot use, so this sort of reboot simulation greatly improves the chances of spotting issues early with a computer node.

The methodology can allow an administrator to preemptively fix a drive before it causes a node to go down and not come back up. The process also lets the administrator of the network perform this replacement at a time that suits them rather than in a state where they are running with reduced redundancy and perhaps with a maintenance window fast closing on them. Even if all the operations in a reboot cannot be simulated, simulating some of the operations still increases the chances of spotting an issue with a drive of a computer node before it happens. Both drives of the computer node can be tested in turn, with an arbitrary time gap in-between the two tests. Beyond the storage sphere, this technique also applies to all computing systems that run with more than one copy of their operating system for redundancy.

A simple example of this is that if a drive is expected to be in the faulty state after a run time of a year and the expected time between reboots is two years, then there will always be double drive failures, effectively giving the same reliability rate that would be seen with only a single drive, meaning that the drive redundancy does not lead to any improvement. While this is an extreme example, it serves to demonstrate that there is room for improvement in the operation of computer nodes in this type of network. This is further exacerbated by the fact that in systems of this type, the internal drives are usually mirrored, so they are both undergoing exactly the same stimuli, and therefore could be expected to go into a "faulty" state much closer together than two truly independent drives.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Embodiments of the present disclosure will now be described, by way of example only, with reference to the following drawings, in which.

Figure 1:
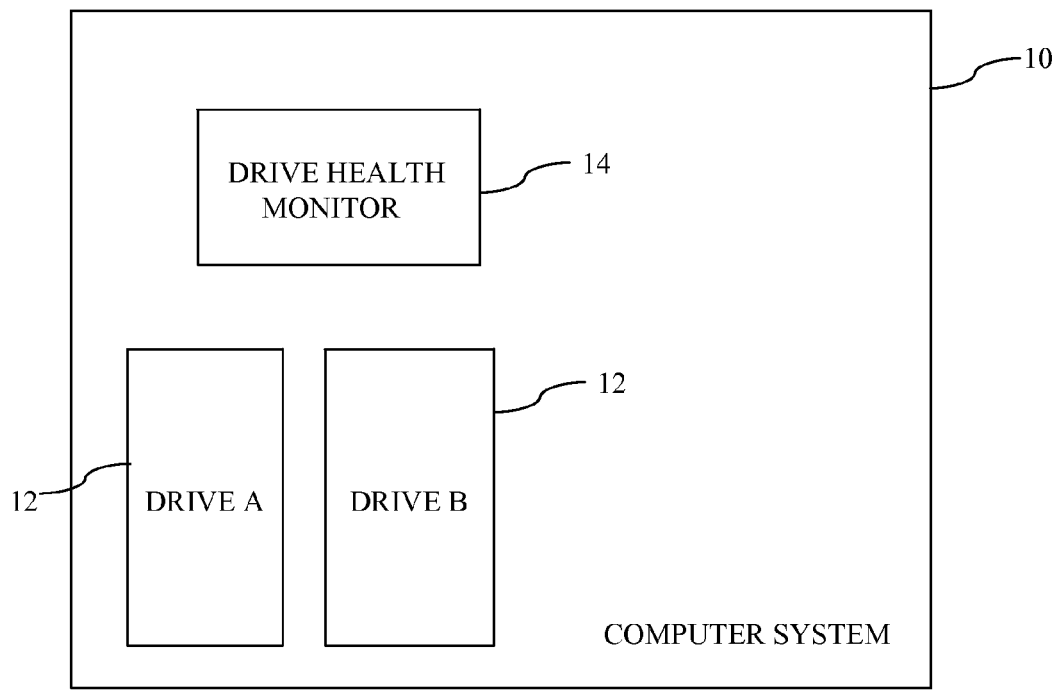
FIG. 1 is a schematic diagram of a computer node.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

FIG. 1 shows a computer node 10, which is part of a cluster of such nodes similar to node 10. The node 10 comprises dual hard drives 12 and a drive health monitor 14. The node 10 also includes other components such as network interfaces and a power supply and so on, but only the components that are material to the testing of the computer node 10 are shown, for simplicity of understanding. Each of the drives 12 in the node 10 can store a copy of the operating system image that manages the hardware within the node 10. The provision of the dual drives 12 is to provide redundancy within the node 10, in order to protect against any failure of an individual drive 12.

The drive health monitor 14 is either a dedicated hardware component within the node 10 or is a software application being executed by an existing component within the node 10. The purpose of the drive health monitor 14 is to periodically test each of the drives 12 and to detect any failure of a drive 12 in respect of a test. If a failure is detected, then the drive health monitor 14 is configured to communicate a notification of such a failure to a system administrator, in order that corrective action can be taken. The operation of the drive health monitor 14 in respect of the testing of the drives 12 is described in more detail below.

The node 10 can form part of an enterprise computing solution such as large cluster of nodes 10 that supports the computing requirements of a large organization such as a financial institution or an online retailer. Since such computing systems can require a very high level of reliability and robustness, the node 10 will be in operation constantly (i.e.; not being turned on and off like a conventional desktop computer or laptop computer). The node 10 will usually only need to be rebooted when a periodic upgrade is performed on each of the copies of the operating system, which are present on each of the drives 12 of the node 10. This long delay between reboots can mean that the drives are in undetected unstable states with respect to a future reboot.

Figure 2:
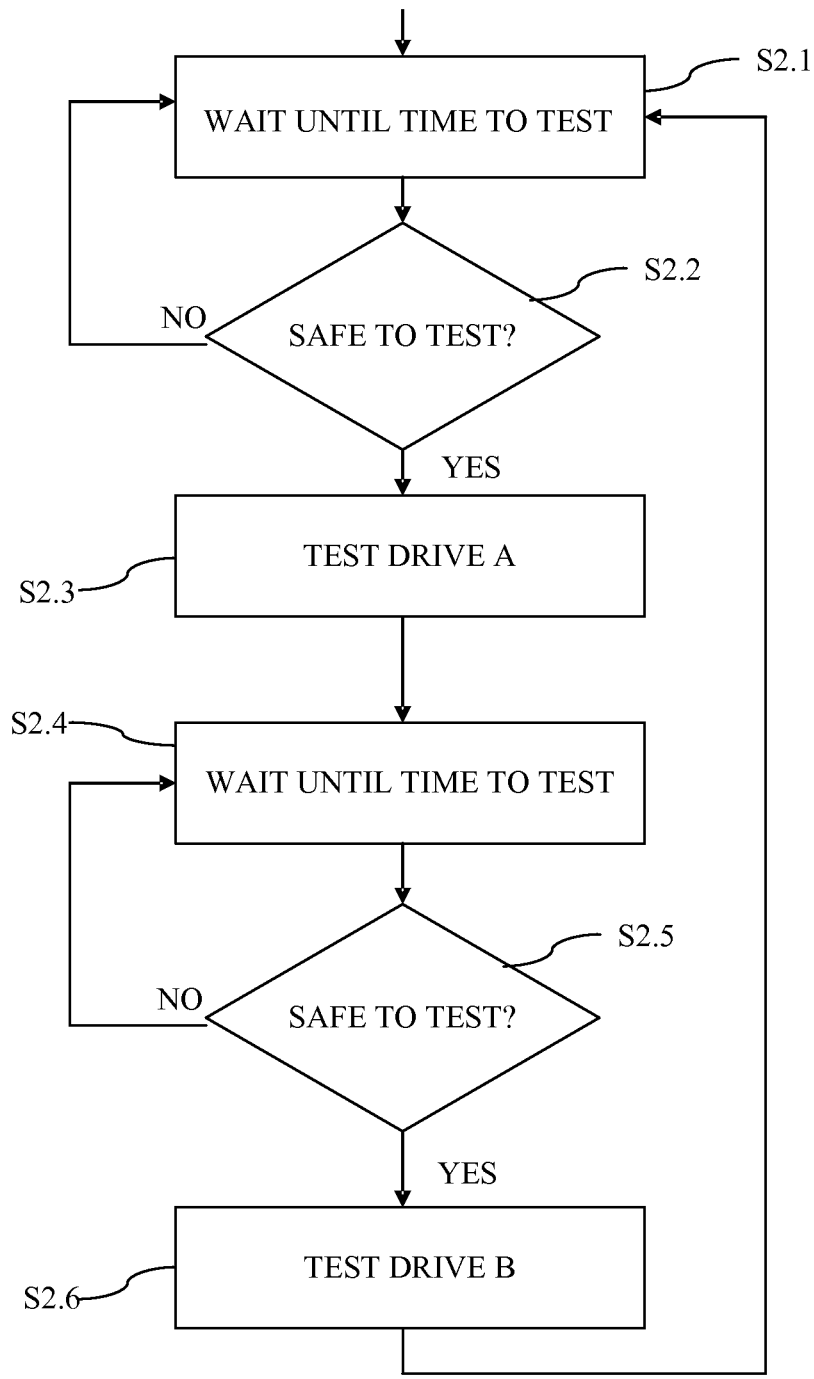
FIG. 2 is a flowchart of a drive health monitoring process.

As shown in FIG. 2, the drive health monitor 14 is configured to monitor the drives 12 in order to try and establish that a drive 12 is in a "faulty" condition, before an upgrade and reboot is actually carried out on a drive. The flowchart of FIG. 2 shows a drive health monitoring process.

At operation S2.1, the drive health monitor 14 waits until it is time to perform a test on a drive 12. The drive health monitor 14 could trigger a test periodically based upon a predefined time period such as once a week or once a month. At operation S2.2, the drive health monitor 14 determines if it is currently safe to perform a test on a drive 12. For example, if drive B is not available then it is not safe to test drive A, because the node 10 would have no functioning boot drive. Both drives 12 need to be available for it to be safe to test one drive.

At operation S2.3 a test is performed on drive A, the first drive 12 of the dual hard drives 12 contained within the node 10. More detail of the specifics of the test are described below, with respect to the flowchart of FIG. 3. Once this test is complete and assumed to be passed by drive A, then the flowchart moves to operation S2.4 and the drive health monitor 14 once again waits until sufficient time has passed before considering a test on drive B. This time predefined time period such as a week or a month will be the same interval as that used in the waiting operation S2.1.

Once the predefined time period has expired, then at operation S2.5 it is determined if it is currently safe to perform the test on drive B and if it is safe to test drive B, then the process moves to operation S2.6 where the test is performed on drive B. In this way, the drive health monitor 14 will periodically test each drive 12 of the node 10, in turn, to ascertain whether the specific drive 12 is likely to be in a "faulty" state such that it would fail next time the drive 12 is rebooted. If a test (in operation S2.3 or S2.6) is failed, then the drive health monitor 14 will notify an administrator.

Figure 3:
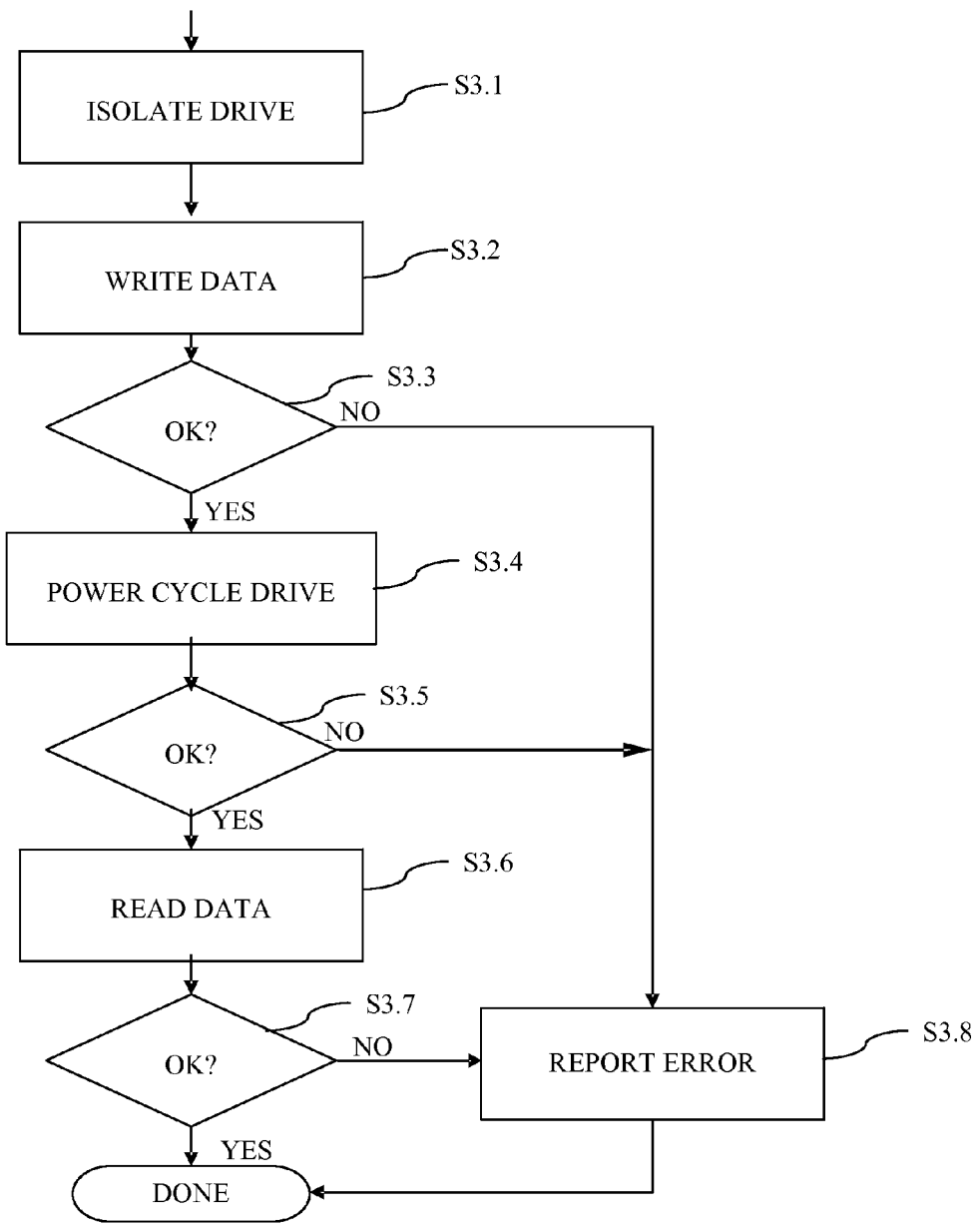
FIG. 3 is a flowchart of a drive test process.

The specifics of a preferred embodiment of a test carried out in either operation S2.3 or S2.6 of FIG. 2 is shown in FIG. 3. This process starts at operation S3.1, where the drive 12 that is being tested is isolated. For example if the mirroring of the two drives 12 is provided by hardware RAID, the isolation mechanism would be to instruct the hardware RAID to take the drive 12 out of the mirroring relationship. Once the drive 12 is isolated then at operation S3.2 data is written to the drive 12 that is being tested. This is essentially the start of the interaction with the drive 12 designed to mimic an upgrade and reboot process. A large amount of dummy data is written to the drive 12 in this operation. This data need not be available locally on the node 10, the drive health monitor 14 can access this data from a remote store.

The next operation of the process is operation S3.3, which comprises checking that no failure occurred during the previous operation. If an error is detected, then the process moves to operation S3.8 and terminates. If no error is detected, then the process moves to operation S3.4, which comprise a power cycle for the drive 12. This cycle comprises removing power from the drive 12 that is being tested and then repowering the drive 12. As before, the next operation of the process, operation S3.5 checks that this power cycle for the drive 12 was completed without any error. Again, if an error is detected, then the process moves to operation S3.8 and terminates.

If the power cycle completes with no error, then the process continues to operation S3.6, which comprises reading back the data that was written to the drive 12 in the earlier operation S3.2 of the test process. This is the final action of the test process in terms of mimicking the upgrade and reboot process. At operation S3.7 a check is made to see if the data reading has executed without error. If there is no error, then the process terminates without incident. Again, if an error is detected, then the process moves to operation S3.8 and terminates. Operation S3.8 comprises reporting the error, whereby the drive health monitor 14 notifies an administrator that an error has been detected.

Figure 4:
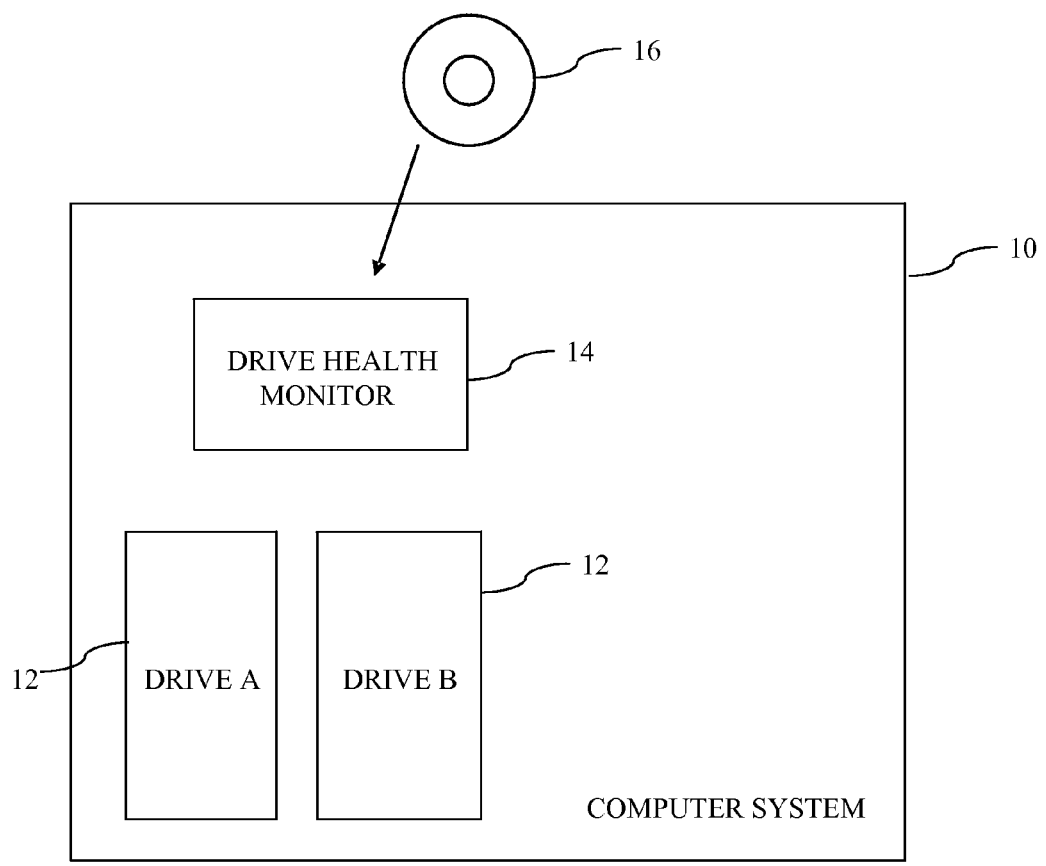
FIG. 4 is a further schematic diagram of the computer node.

FIG. 4 shows the computer node 10 of FIG. 1, with the addition of a CD-ROM 16, which is a computer readable medium that stores a computer program product. The operation of the drive health monitor 14 is controlled by the instructions that make up the computer program product on the CD-ROM 16. The process executed by the drive health monitor 14 is according to the instructions of the computer program product. All of the actions taken by the drive health monitor 14 are controlled by the computer program product, including the external communications such as notifying an administrator that an error has been detected in a drive test process.

The drive health monitor 14, as per the process of FIG. 2, periodically tests each drive 12 of the node 10, in turn. The period between each test can be set automatically or can be triggered remotely by an administrator, for example. An administrator may bring forward testing of a node 10 for example, if another node 10 in the cluster generates a test failure. If there is no external request for a test of one or both drives 12 of the node 10, then the drive health monitor 14 will schedule tests of the drives 12 according to the period set by the computer program product. This period could be every 5 days for example, which ensures that both drives 12 are tested at least once every 10 days.

Once a decision to test a drive 12 has been taken, then the process of FIG. 3 is executed for the specific drive 12 being tested. This methodology essentially comprises writing a large chunk of data to the drive 12, removing power from the drive 12, re-powering the drive 12 and reading a large chunk of data from the drive 12. The amount of data written to the drive 12 is above a predetermined size, in order to ensure that as close a model to an actual upgrade and reboot is achieved. Any error that occurs in any of the operations leads to the reporting of the existence of an error and the nature of the error to an administrator. In this way any potential future failure in a drive 12 at an upgrade and reboot is spotted ahead of time and can be dealt with in advance.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of testing a computer node having dual hard drives, the method comprising:
    performing a test of a first hard drive;
    waiting a specific time period; and
    performing a test of a second hard drive;
wherein each test comprises:
    isolating a drive being tested;
    writing data to the drive being tested;
    removing power from the drive being tested;
    repowering the drive being tested; and
    reading data from the drive being tested.

2. The method of claim 1, wherein writing data to the drive being tested comprises writing an amount of data to the drive that is above a predetermined size.

3. The method of claim 1, wherein reading data from the drive being tested comprises reading an amount of data that was written to the drive in test writing of data to the drive being tested.

4. The method of claim 1, further comprising, prior to performing a test on a hard drive, determining that it is safe to perform the test on the hard drive.

5. The method of claim 1, wherein performing a test of the first hard drive occurs periodically, according to a predefined time period.

6. A computer node comprising dual hard drives and a drive health monitor, the drive health monitor configured to:
    perform a test of a first hard drive;
    wait a specific time period; and
    perform a test of a second hard drive;
wherein each test comprises:
    isolating a drive being tested;
    writing data to the drive being tested;
    removing power from the drive being tested;
    repowering the drive being tested; and
    reading data from the drive being tested.

7. The computer node of claim 6, wherein the drive health monitor is configured, when writing data to the drive being tested, to write an amount of data to the drive that is above a predetermined size.

8. The computer node of claim 6, wherein the drive health monitor is configured, when reading data from the drive being tested, to read an amount of data that was written to the drive in test writing data to the drive being tested.

9. The computer node of claim 6, wherein the drive health monitor is further configured, prior to performing a test on a hard drive, to determine that it is safe to perform the test on the hard drive.

10. The computer node of claim 6, wherein the drive health monitor is configured to periodically perform a test of the first hard drive according to a predefined time period.

11. A computer program product on a non-transitory computer-readable medium for testing a computer node having dual hard drives, the computer program product comprising instructions for:
    performing a test of a first hard drive;
    waiting a specific time period; and
    performing a test of a second hard drive;
wherein each test comprises instructions for:
    isolating the drive being tested;
    writing data to the drive being tested;
    removing power from the drive being tested;
    repowering the drive being tested; and
    reading data from the drive being tested.

12. The computer program product of claim 11, wherein the instructions for writing data to the drive being tested further comprise instructions for writing an amount of data to the drive that is above a predetermined size.

13. The computer program product of claim 11, wherein the instructions for reading data from the drive being tested further comprise instructions for reading an amount of data that was written to the drive in test writing data to the drive being tested.

14. The computer program product of claim 11, and further comprising, prior to performing a test on a hard drive, instructions for determining that it is safe to perform the test on the hard drive.

15. The computer program product of claim 11, wherein the instructions for performing a test of the first hard drive occur periodically, according to a predefined time period.

* * * * *